United States Patent
Werman et al.

(10) Patent No.: US 9,323,054 B2
(45) Date of Patent: Apr. 26, 2016

(54) DISPLAY ASSEMBLY HOOKS FOR INSTALLATION IMPROVEMENT

(71) Applicants: DENSO International America, Inc., Southfield, MI (US); DENSO CORPORATION, Kariya-shi, Aichi-ken (JP)

(72) Inventors: Reben Werman, Sterling Heights, MI (US); Patrick O'Connell, Farmington Hills, MI (US)

(73) Assignees: Denso International America, Inc., Southfield, MI (US); DENSO CORPORATION, Kariya (JP)

( * ) Notice: Subject to any disclaimer, the term of this patent is extended or adjusted under 35 U.S.C. 154(b) by 99 days.

(21) Appl. No.: 13/942,052

(22) Filed: Jul. 15, 2013

(65) Prior Publication Data

US 2015/0016089 A1    Jan. 15, 2015

(51) Int. Cl.
  *G09F 13/04* (2006.01)
  *G09F 13/08* (2006.01)
  *G02B 27/01* (2006.01)

(52) U.S. Cl.
  CPC ............ *G02B 27/0149* (2013.01); *G02B 27/01* (2013.01); *G02B 2027/0169* (2013.01)

(58) Field of Classification Search
  CPC .......................... G02B 27/0149; H05K 5/0017
  See application file for complete search history.

(56) References Cited

U.S. PATENT DOCUMENTS

2013/0208363 A1*   8/2013   Masuda .................. 359/630

* cited by examiner

*Primary Examiner* — Evan Dzierzynski
*Assistant Examiner* — Zachary J Snyder
(74) *Attorney, Agent, or Firm* — Harness, Dickey & Pierce, P.L.C.

(57) ABSTRACT

A heads-up-display assembly includes a display module and a circuit board. The display module is configured to display an image on a display surface, remote to the display module. The display module includes a housing, a visual display, and one or more retention members. The circuit board controls the visual display and is coupled to the display module by a first wire. The circuit board is movable between a first configuration in which the circuit board is free to hang from the display module by the first wire, and a second configuration in which the circuit board is removably retained to the housing by the one or more retention members and not free to hang by the first wire.

9 Claims, 3 Drawing Sheets

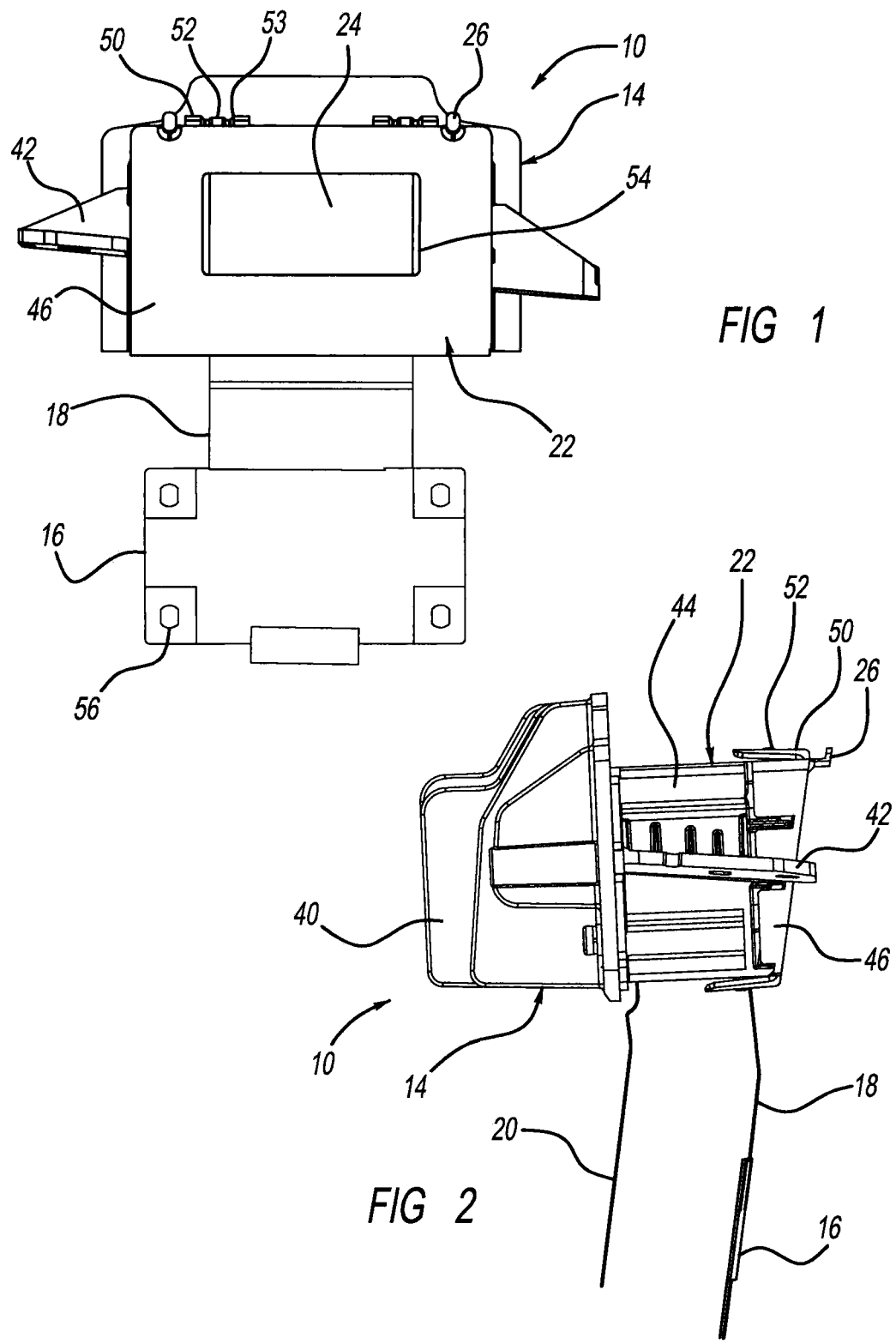

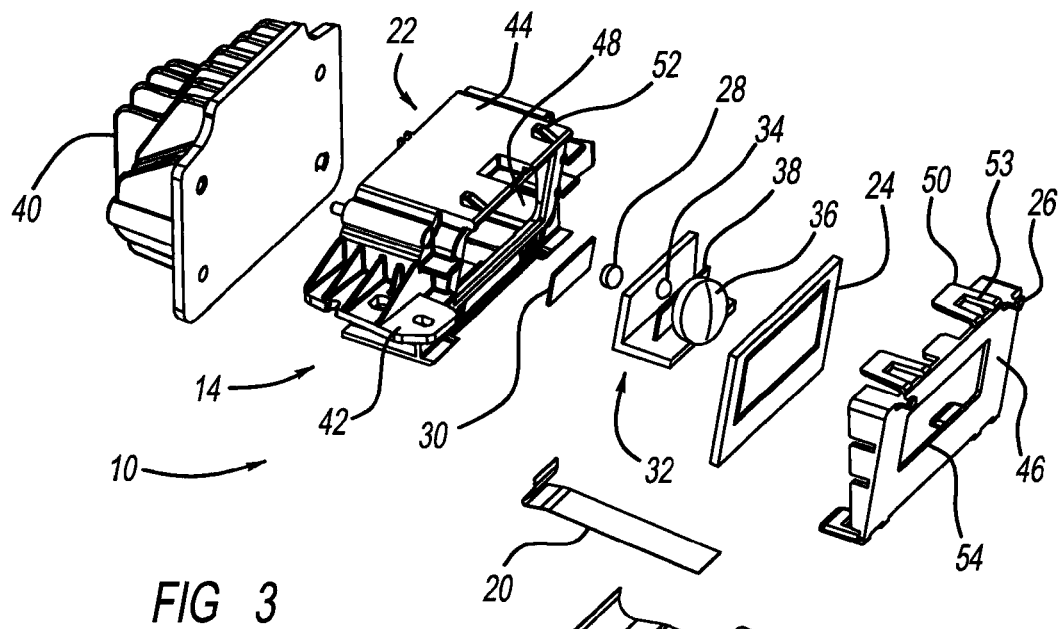
FIG 3
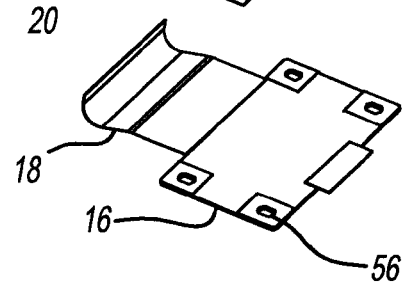
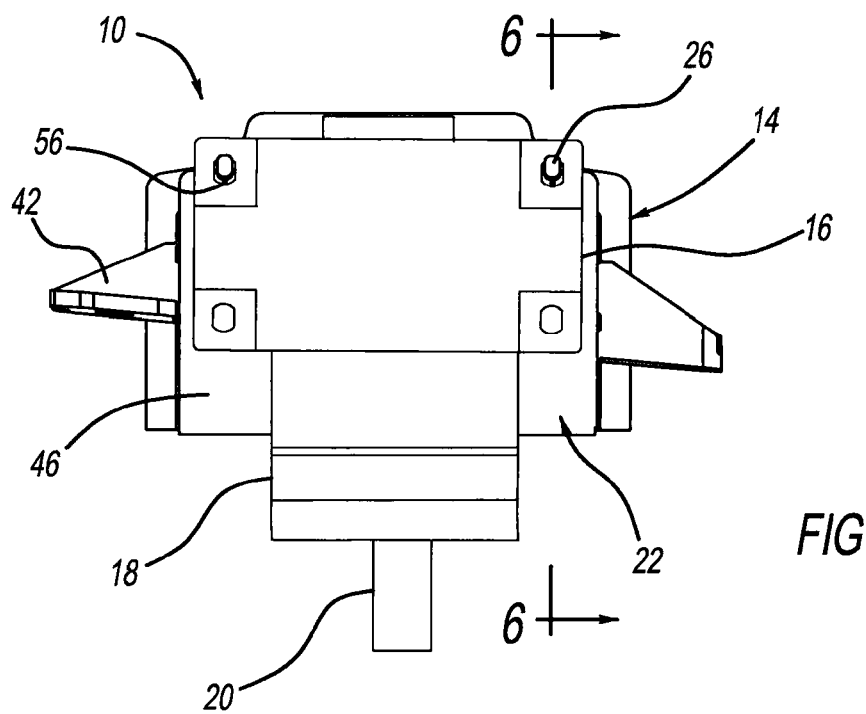
FIG 4

DISPLAY ASSEMBLY HOOKS FOR INSTALLATION IMPROVEMENT

FIELD

The present disclosure relates to display assembly hooks to facilitate installation of a display assembly, for example, a heads-up-display, such as in a motor vehicle.

BACKGROUND

This section provides background information related to the present disclosure, which is not necessarily prior art.

Heads-up-displays ("HUDs") are used in vehicles, such as commercial or passenger cars and trucks, to provide occupants with information without having to take their eyes off the road. This information can include, for example, vehicle speed, fuel level, fuel efficiency, vehicle statistics, pedestrian warnings, obstacle warnings, time of day, route guidance, navigation, road conditions, traffic alerts, news, music or entertainment information, communications, and most any other information that occupants may desire. As HUDs become more common in mass produced vehicles, it is advantageous to be able to assemble the HUDs quickly and cost effectively.

HUD assemblies typically include a display module connected to a main circuit board by a controlling circuit board, and various other wires or connectors. Prior HUD assemblies required an assembly worker to hold the display module, the controlling circuit board, and various other connectors with one hand while making delicate wiring connections with the other hand. This task can be difficult and time consuming, which may lead to prolonged assembly times and a higher cost per unit.

SUMMARY

This section provides a general summary of the disclosure, and is not a comprehensive disclosure of its full scope or all of its features.

The present teachings provide for a heads-up-display assembly including a display module and a circuit board. The display module is configured to display an image on a display surface, remote to the display module. The display module includes a housing, a visual display, and one or more retention members. The circuit board controls the visual display and is coupled to the display module by a first wire. The circuit board is movable between a first configuration in which the circuit board is free to hang from the display module by the first wire, and a second configuration in which the circuit board is removably retained to the housing by the one or more retention members and not free to hang by the first wire.

The present teachings also provide for a heads-up-display assembly including a display module and a circuit board. The display module is configured to display an image on a display surface, remote to the display module. The display module includes a housing, a visual display housed within the housing, and one or more retention hooks coupled to the housing. The circuit board controls the visual display and is coupled to the display module by a first wire. The circuit board defines one or more apertures. The circuit board is movable between a first configuration in which the circuit board is free to hang from the display module by the first wire, and a second configuration in which the one or more apertures cooperate with the one or more retention hooks to removably retain the circuit board thereto and exterior to the housing.

The present teachings further provide for a heads-up-display assembly including a display module, and a circuit board. The display module is configured to display an image on a display surface, remote to the display module. The display module includes a visual display, a housing assembly, and one or more retention hooks. The housing assembly houses the visual display and includes a first housing portion and a second housing portion. The first housing portion defines a first housing cavity housing a light source. The light source is configured to illuminate the visual display. The second housing portion is coupled to the first housing portion and configured to cap the first housing cavity. The second housing portion defines a second housing aperture, the visual display is visible from the exterior of the housing assembly through the second housing aperture. The one or more retention hooks extend from the housing assembly. The circuit board controls the visual display and is coupled to the display module by a first wire. The circuit board defines one or more apertures. The circuit board is movable between a first configuration in which the circuit board is free to hang from the display module by the first wire, and a second configuration in which the one or more apertures cooperate with the one or more retention hooks to removably retain the circuit board thereto and exterior to the housing assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a front view of a heads-up-display assembly in a first configuration, prior to installation;

FIG. 2 is a side view of the heads-up-display assembly of FIG. 1;

FIG. 3 is an exploded perspective view of the head-up-display assembly of FIG. 1;

FIG. 4 is a front view of the heads-up-display assembly of FIG. 1 in a second configuration;

Corresponding reference numerals indicate corresponding parts throughout the several views of the drawings.

DETAILED DESCRIPTION

Example embodiments will now be described more fully with reference to the accompanying drawings.

Figure 6:
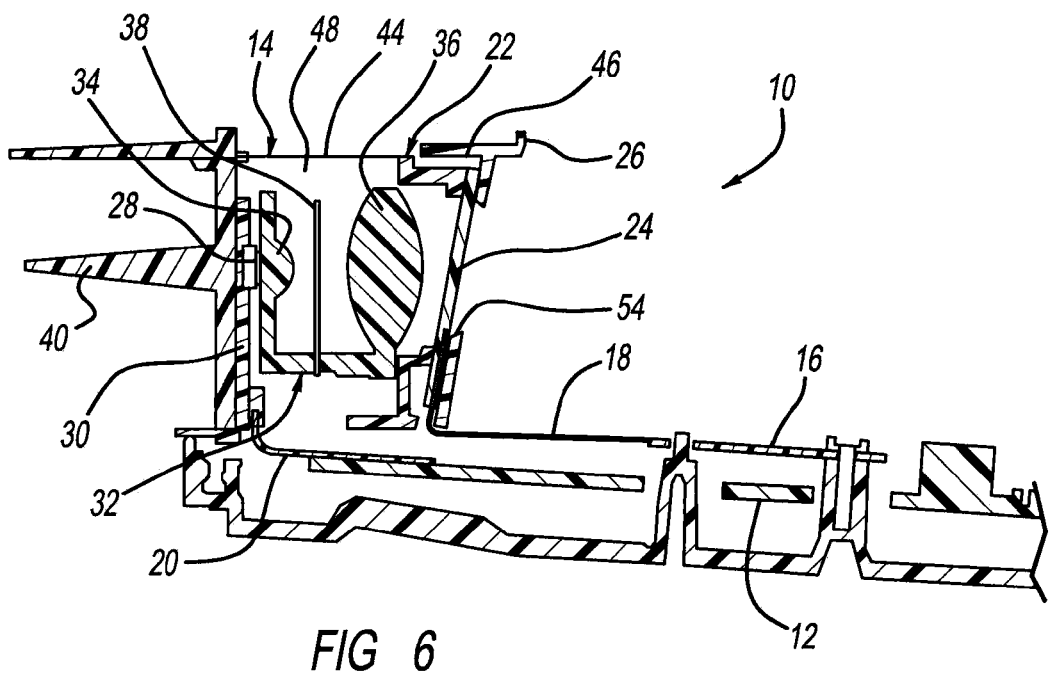
FIG. 6 is a cross-sectional view of the heads-up-display assembly of FIG. 1 installed on a main circuit board.

The present teachings are directed to a head-up-display ("HUD") for a vehicle, such as an automobile, sport utility vehicle, truck, aircraft, machine, or any other suitable vehicle, to provide occupants of the vehicle with information without taking their eyes off the road or current trajectory of the vehicle. FIG. 1 illustrates a heads-up-display assembly according to the present teachings, prior to installation, at reference numeral 10. With reference to FIG. 6, the heads-up-display assembly of FIG. 1 is shown installed on a main circuit board 12. The main circuit board 12 can be installed in the vehicle and can communicate with the vehicle and the heads-up-display assembly to provide the occupants with most any kind of information including, for example, vehicle speed, fuel level, fuel efficiency, vehicle statistics, pedestrian warnings, obstacle warnings, time of day, route guidance, navigation, road conditions, traffic alerts, news, music or entertainment information, or communications.

With reference to FIGS. 1-6, the heads-up-display assembly 10 includes a display module 14, a circuit board 16, a first wire 18, and one or more secondary wires 20. The display module 14 is configured to display an image on a display surface, typically spaced apart from the display module 14, such as a vehicle windshield or other surface in an occupant's line of sight. The image displayed provides the occupants with the aforementioned information.

With reference to FIGS. 1-5, the display module 14 generally includes a housing 22, a visual display 24, and one or more retention members 26 coupled to the housing 22. The housing 22 can be made from any suitable material, such as a thermoplastic material. The one or more retention members 26 can also be formed of any suitable material, such as a thermoplastic material, and can be integrally formed on the housing 22 or coupled thereto in any suitable manner. For example, the retention members 26 can be coupled to the housing 22 with a fastener such as a screw, bolt, snap, clip, adhesive, weld, or other fastening means.

The visual display 24 can be a thin-film-transistor ("TFT") display or any other suitable display. With reference to FIGS. 3 and 6, the display module 14 further includes a light source 28 configured to illuminate the visual display 24 in order to display the image on the display surface. The light source 28, for example, can be a light emitting diode ("LED") or other suitable element for illuminating the visual display 24. The display module can include an internal circuit board 30 for controlling the light source 28. The display module 14 can include one or more light manipulation elements 32. The light manipulation elements 32 can include a first prism 34, a second prism 36, and a diffuser sheet 38. The one or more light manipulation elements 32 can cooperate to diffuse and spread the light emitted from the light source 28 and evenly distribute the light across the visual display 24.

The display module 14 can also include a heat sink 40. The heat sink 40 can be made of metal or other suitable heat conducting material and be configured to dissipate heat generated by the display module 14. For example, the heat sink 40 may dissipate heat generated by the light source 28, the internal circuit board 30, or other electrical components in order to maintain desired operating temperatures.

The housing 22 can include a mounting bracket 42 for mounting the display module 14 to the main circuit board 12 or within the vehicle. The housing 22 can include a first housing portion 44 and a second housing portion 46. In such an arrangement, the first housing portion 44 defines a first housing cavity 48 configured to house the light source 28. The first housing cavity 48 can also house the internal circuit board 30 and the one or more light manipulation elements 32. The second housing portion 46 can be coupled to the first housing portion 44 and configured to cap the first housing cavity 48. As an example, the first housing portion 44 is shown coupled to the second housing portion 46 by clips 50 that cooperate with tabs 52, although any other suitable means of attachment can be used. In the example shown, the clips 50 define an aperture 53. As the first housing portion 44 and the second housing portion 46 are brought together, the clips 50 deform to allow the aperture 53 to receive and secure the tabs 52. The second housing portion 46 can hold the visual display 24 in place by holding the visual display 24 against the first housing portion 44. The second housing portion 46 can have a second housing aperture 54 configured to allow the light source 28 to illuminate the visual display 24 and to display the image through the second housing aperture 54 and thus onto the display surface.

The circuit board 16 can be connected to the visual display 24 by the first wire 18, and can be configured to control the visual display 24. In the first configuration, illustrated in FIGS. 1 and 2, the circuit board 16 is free to hang from the display module 14 by the first wire 18. The circuit board 16 can be configured to connect to the main circuit board 12 (see FIG. 6) to receive, convert, and process video signals therefrom. The one or more secondary wires 20 are connected to the display module 14 and can, for example, provide power or other electrical signals to the display module 14 necessary for the operation of the heads-up-display assembly 10. For example, one of the one or more secondary wires 20 may provide power or controlling signals to the light source 28 or other internal components. The one or more secondary wires 20 can be configured to attach to the main circuit board 12 (see FIG. 6).

Figure 5:
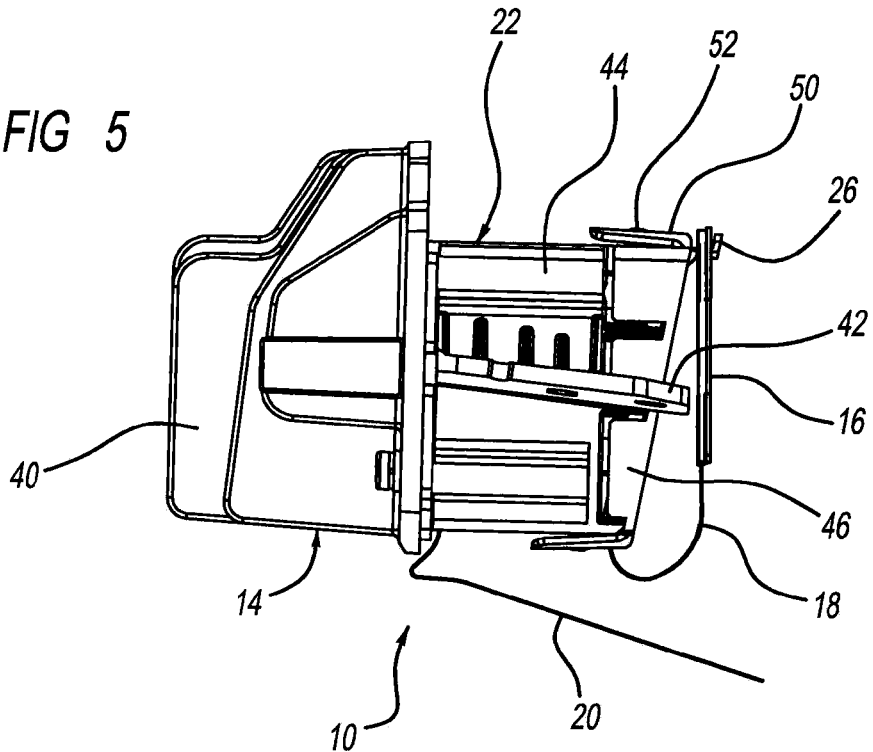
FIG. 5 is a side view of the heads-up-display assembly of FIG. 1 in the second configuration.

With reference to the second configuration shown in FIGS. 4 and 5, the one or more retention members 26 are configured to cooperate with the circuit board 16 to removably retain the circuit board 16 thereto. In one embodiment, the circuit board 16 can define one or more apertures 56 and the one or more retention members 26 can cooperate with the one or more apertures 56 to retain the circuit board thereto. The one or more retention members 26 can be hooks and the one or more apertures 56 can be configured to removably hang from the one or more retention members 26. However, it is contemplated that the one or more retention members 26 can be configured to cooperate with the circuit board 16 in any other suitable manner to removably retain the circuit board 16, for example, incorporating hooks on the circuit board 16, or utilizing adhesives.

With specific reference to FIGS. 4 and 5, during installation of the heads-up-display assembly 10, the circuit board 16 can be removably coupled to the one or more retention members 26 so that the circuit board 16 does not hang below the display module 14. The one or more retention members 26 prevent the circuit board 16 from interfering with the connection of the one or more secondary wires 20 and the installation of the display module 14 without requiring an assembly worker to directly hold the circuit board 16. This frees the assembly worker's hands to perform other tasks until the circuit board 16 itself is installed, such as, connecting the one or more secondary wires 20 or the display module 14 to the main circuit board 12 or the vehicle, for example. As illustrated, the one or more retention members 26 are coupled near the top of the second housing portion 46. However, the one or more retention members 26 can be located in other locations on the housing 22 as long as the one or more retention members 26 cooperate with the circuit board 16 to prevent the circuit board 16 from interfering with installation of the display module 14 or the one or more secondary wires 20. For example, the one or more retention members 26 can be located on the first housing portion 44 or on either portion of the housing 22, but away from the top of the housing 22.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed herein could be termed a second element, component, region, layer or section without departing from the teachings of the example embodiments.

Spatially relative terms, such as "inner," "outer," "below," "lower," "above," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A heads-up-display assembly comprising:
    a display module configured to display an image on a display surface remote to the display module, the display module including a housing, a visual display housed within the housing, and one or more retention hooks coupled to the housing; and
    a circuit board configured to control the visual display and coupled to the display module by a first wire, the circuit board defining one or more apertures; wherein
    the circuit board is movable between a first configuration in which the circuit board is free to hang from the display module by the first wire such that the circuit board does not obstruct viewing of the visual display, and a second configuration in which the one or more apertures cooperate with the one or more retention hooks to removably retain the circuit board thereto and exterior to the housing such that the circuit board obstructs viewing of the visual display through a housing aperture defined by the housing;
    the housing comprises a first housing portion and a second housing portion, the first housing portion defining a first housing cavity, a light source is located within the first housing cavity, the second housing portion is coupled to the first housing portion to cap the first housing cavity, the second housing portion defining the housing aperture;
    the one or more retention hooks are integrally formed onto the second housing portion; and
    the visual display is illuminated by the light source and is visible from the exterior of the housing through the housing aperture.

2. The heads-up-display assembly of claim 1, wherein the visual display is a thin-film-transistor display and the display module further includes a light source, the light source configured to illuminate the visual display.

3. The heads-up-display assembly of claim 2, further comprising a second circuit board, the second circuit board disposed within the housing and configured to control the light source.

4. The heads-up-display assembly of claim 1, wherein the display module further includes a heat sink coupled to the housing to dissipate heat generated by the display module.

5. A heads-up-display assembly comprising:
    a display module configured to display an image on a display surface remote to the display module, the display module including:
        a visual display;
        a housing assembly housing the visual display and including a first housing portion and a second housing portion, the first housing portion defining a first housing cavity, the first housing cavity housing a light source configured to illuminate the visual display, the second housing portion is coupled to the first housing portion to cap the first housing cavity and defines a housing aperture, the visual display is visible from the exterior of the housing assembly through the housing aperture; and
        one or more retention hooks extending from the housing assembly about the housing aperture; and
    a circuit board configured to control the visual display and coupled to the display module by a first wire, the circuit board defining one or more apertures;
    wherein the circuit board is movable between a first configuration in which the circuit board is free to hang from the display module by the first wire so as to not obstruct viewing of the visual display through the housing aperture, and a second configuration in which the one or more apertures cooperate with the one or more retention hooks to removably retain the circuit board thereto and exterior to the housing assembly so as to cover the housing aperture and prevent viewing of the visual display through the housing aperture.

6. The heads-up-display assembly of claim 5, wherein the visual display is a thin-film-transistor display.

7. The heads-up-display assembly of claim 5, wherein the one or more retention hooks are coupled to the second housing portion.

8. The heads-up-display assembly of claim 5, further comprising a second circuit board, the second circuit board disposed within the first housing cavity and configured to control the light source.

9. The heads-up-display assembly of claim 5, wherein the display module further includes a heat sink coupled to the housing assembly to dissipate heat generated by the display module.

* * * * *